US 8,416,909 B2

(12) United States Patent
Childers et al.

(10) Patent No.: US 8,416,909 B2
(45) Date of Patent: Apr. 9, 2013

(54) NUCLEAR FUEL CELL REPAIR TOOL

(75) Inventors: Walter S. Childers, Brazoria, TX (US);
Terry A. Brewer, Palacios, TX (US);
Satish K. Dubey, Sugar Land, TX (US);
Robert L. Schuck, Jones Creek, TX (US)

(73) Assignee: STP Nuclear Operating Company, Wadsworth, TX (US)

( * ) Notice: Subject to any disclaimer, the term of this patent is extended or adjusted under 35 U.S.C. 154(b) by 783 days.

(21) Appl. No.: 12/569,746

(22) Filed: Sep. 29, 2009

(65) Prior Publication Data

US 2011/0075784 A1   Mar. 31, 2011

(51) Int. Cl.
*G21C 19/26* (2006.01)
*G21C 21/02* (2006.01)
*G21C 19/00* (2006.01)
*G21C 21/00* (2006.01)

(52) U.S. Cl. .............. 376/260; 376/261; 976/DIG. 207; 29/592; 29/402.01; 29/402.19

(58) Field of Classification Search ................. 376/245, 376/248, 249, 260–267; 976/DIG. 207; 29/592, 29/402.01, 402.19
See application file for complete search history.

(56) References Cited

U.S. PATENT DOCUMENTS

| 4,539,738 | A | * | 9/1985 | Antol et al. .................. 376/261 |
| 4,572,816 | A | | 2/1986 | Gjertsen et al. |
| 4,652,421 | A | | 3/1987 | Widener |
| 4,668,466 | A | | 5/1987 | Rylatt |
| 4,688,416 | A | | 8/1987 | Shallenberger et al. |
| 4,791,801 | A | | 12/1988 | Kramer et al. |
| 4,832,901 | A | | 5/1989 | Dailey |
| 5,032,347 | A | * | 7/1991 | Guironnet .................... 376/248 |
| 5,254,835 | A | | 10/1993 | Dalke et al. |

FOREIGN PATENT DOCUMENTS

WO   PCT/US2010/050579   11/2010

* cited by examiner

*Primary Examiner* — Bernarr Gregory
(74) *Attorney, Agent, or Firm* — Cox Smith Matthews Incorporated

(57) ABSTRACT

A method of repairing a nuclear fuel cell wall and tools useful for performing that repair are described. A repair tool may be used to align a jack near a region of a bent or distorted structural component of nuclear fuel cell and that jack may be used to apply a force to that structural component. Application of such a force may serve to bend the structural component of a nuclear fuel cell in a way to restore the structural component to its position before damage occurred. The repair tool includes a way of mounting that tool to a fuel cell, positioning elements to align the tool near a structural deformation or bent element and a jack that may be use to apply a force to at least one structural component in a fuel cell.

20 Claims, 4 Drawing Sheets

NUCLEAR FUEL CELL REPAIR TOOL

FIELD

This application relates generally to a tool for repairing nuclear fuel cells and a method of performing such repairs.

BACKGROUND

A nuclear fuel cell is a part of a nuclear reactor that may include fuel rods housed within one or more fuel cell walls. Additional structural material may be present to support the fuel rods. Fuel cell walls may at least in part provide structural support to the fuel cell and may at least in part constrain the flow of a fluid so that it moves across the fuel rods. It is in general important to have efficient fluid flow across fuel cell rods to achieve effective transfer of energy from nuclear reactions to that fluid. Therefore, in most designs, fuel rods are relatively long and narrow, thus providing sufficient surface area for energy exchange with the fluid. Those requirements impact the physical requirements for structural elements in the nuclear reactor and in particular impact the design of fuel cell walls. Nuclear fuel cells may be stored in large tanks of water or other liquid before, during, and after use in a nuclear reactor. When loading and unloading nuclear fuel cells, the fuel cell walls may become structurally deformed and in need of repair before further use. Repair of damaged fuel cell walls may be complicated for several reasons, including but not limited to the presence of high levels of radioactive contamination associated with nuclear fuel cell walls and being disposed under water or other liquid. Those difficulties, and associated delays and down time in dealing with repair of nuclear fuel cell walls, may be extremely costly for a nuclear power facility. Thus, there is a need for a nuclear fuel cell repair tool and an efficient method of repairing deformed fuel cell walls.

SUMMARY

A method of repairing a nuclear fuel cell wall and tools useful for accomplishing the repair of a nuclear fuel cell wall are described. A repair tool having a jack may be used to align the jack with a bend, or other structural deformity, of a nuclear fuel cell wall, and the jack may be used to apply a force to that structural deformity. Application of such a force may serve to bend the nuclear fuel cell wall in a way to restore the structural component substantially to its original condition.

DETAILED DESCRIPTION

As used herein, the following terms should be understood to have the indicated meanings:

When an item is introduced by "a" or "an," it should be understood to mean one or more of that item.

"Comprises" means includes but is not limited to.

"Comprising" means including but not limited to.

"Having" means including but not limited to.

A "nuclear fuel cell" is a part of a nuclear reactor that includes at least one nuclear fuel cell rod and one or more structural elements to support the at least one nuclear fuel cell rod.

A "nuclear fuel cell wall" is a structural component of a nuclear fuel cell that at least in part houses at least one nuclear fuel cell rod.

A "joint" is a connection that allows for relative motion between two elements of a tool. Such motion may be in one or more degrees of freedom.

An "actuator" is a device that is capable of activating a jack. An actuator may operate by any suitable means, including without limitation an electrical signal, optical signal, pressure differential, and a combination of any of the foregoing.

A "jack" is a device capable of applying a force to an item. A jack may operate by any suitable means, including but not limited to hydraulic, pneumatic, mechanical or electromechanical. A jack may be constructed from various components, including but not limited to any combination of a rack and pinion, helical spline, enclosed piston crank, scotch yoke, piston chain, cylinder and plunger, solenoid, and a combination of any of the foregoing.

A nuclear fuel cell wall may become damaged and may experience a structural deformation, including but not limited to a bending deformation. Repair of a structural deformation may be accomplished by applying a correcting force to the damaged nuclear fuel cell wall, as described in more detail herein. That force may be applied using a repair tool as described herein, and application of that correcting force may stress the wall in an opposite direction to a strain that may have caused that structural deformation and may bend the wall towards and perhaps beyond its original position. Upon removing the correcting force, the nuclear fuel cell wall may be placed in a position at or near the ideal position of the nuclear fuel cell wall. Such an approach may be useful for any number of nuclear fuel cell designs, including but not limited to those where flow of fluid is parallel to or transverse to nuclear fuel cell rods.

Figure 1:
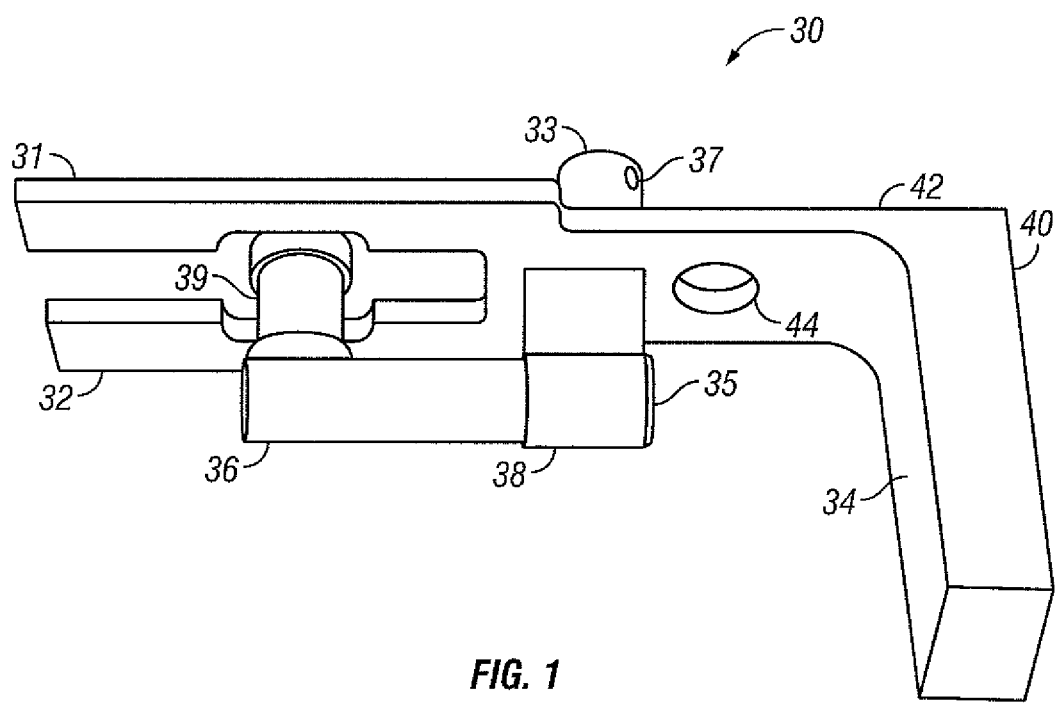
FIG. 1 is a bottom perspective view of a fuel cell repair tool.
Figure 2:
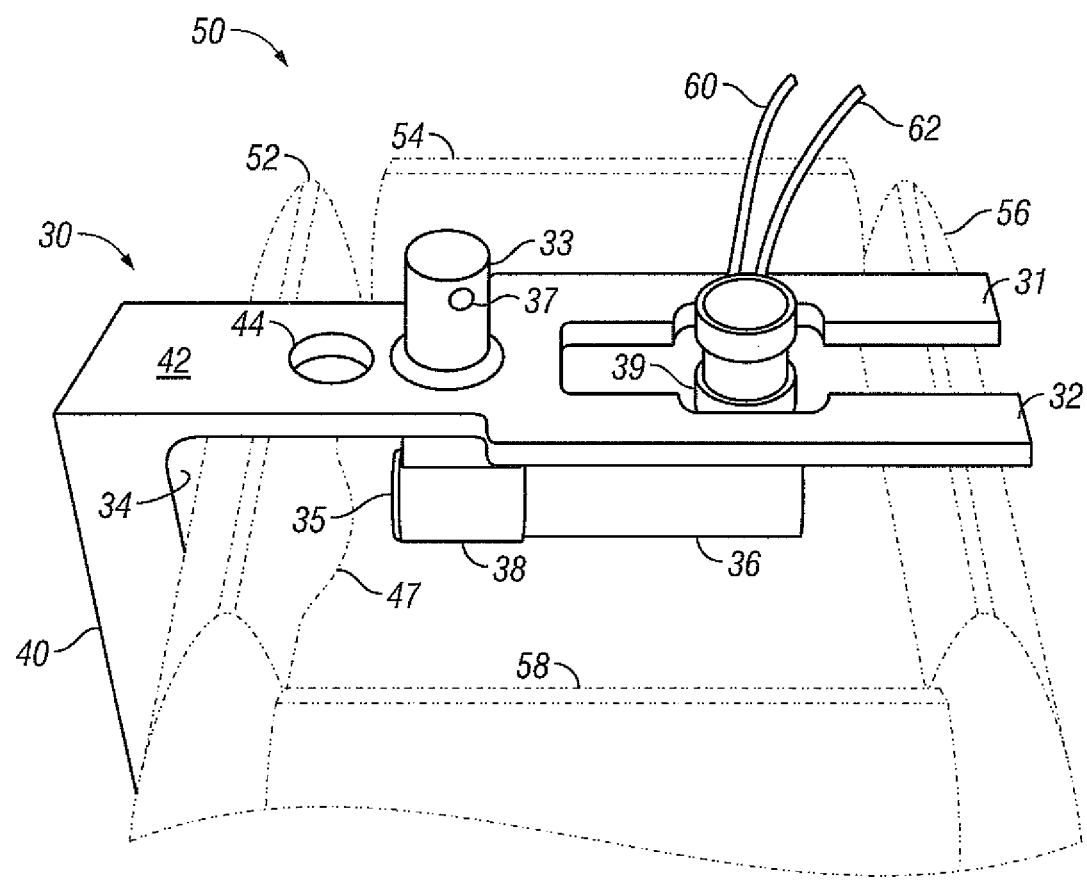
FIG. 2 is a top perspective view of the fuel cell repair tool of FIG. 1 mounted on a nuclear fuel cell.

FIG. 1 shows a repair tool 30 useful for repairing a bent or structurally deformed nuclear fuel cell wall. In FIG. 2, repair tool 30 is shown mounted on walls 52, 56 of a nuclear fuel cell 50. Repair tool 30 may have a first arm 31, a second arm 32, and a post 40 depending from a main body 42. In some embodiments, arms 31, 32 and body 42 may support the repair tool 30 and may be in contact with one or more nuclear fuel cell walls. First arm 31 and second arm 32 are shown resting on a first nuclear fuel cell wall 56 and serve as support members. The bottom surface of repair tool body 42 is shown resting on a second nuclear fuel cell wall 52, and an inner surface 34 of post 40 is shown in contact with an outer surface of wall 52. In FIG. 2, a structural deformation 47 is shown on nuclear fuel cell wall 52, and first arm 31, second arm 32, and body 42 are resting on parallel walls 52, 56 as shown. Of course, a structural deformation may be found on any wall, or on multiple walls, of a nuclear fuel cell, and repair tool 30 may be oriented as appropriate in relation to one or more structural deformations, regardless of the configuration of the walls 52, 54, 56, 58. While the nuclear fuel cell 50 shown in FIG. 2 is rectangular, other embodiments of repair tools may be useful for other nuclear fuel cells, including those designs involving shapes that may not be rectangular. Repair tool 30 may include a hole 44 that extends through the body 42. Hole 44 may be used to visually inspect deformation 47, either directly or via a camera or optic line. Repair tool 30 may have an extension 33 with an opening 37 therein or therethrough. As described in more detail herein, extension 33 and opening 37 may in some embodiments play a role in placement of repair tool 30 on nuclear fuel cell 50 or alignment of repair tool 30 near a structural deformation 47. For example, a rod or cable may be attached to opening 37 via a hook or other suitable attachment to facilitate raising and lowering repair tool 30 into position. A jack 36 may be attached to the repair tool body 42 via a mount 38. Jack 36 may be fixedly attached to or integral to body 42 or may be attached to body 42 with a suitable joint. Jack 36 may be used to apply a force to deformation 47 by pressing a contact surface 35 of jack 36 against deformation 47, which may be reacted against post 40. Post 40 thus serves as a force reacting member, which may be aligned with and spaced apart from jack 36 as shown in FIGS. 1 and 2. In some embodiments, the deformation 47 may be subject to a compressive force as contact surface 35 is moved towards inner surface 34 of post 40 of repair tool 30. Repair tool 30 may include an actuator 39 that may function to position contact surface 35 of jack 36 with respect to deformation 47. Repair tool 30 may include an electrical wire 60, which may be used to provide power to actuator 39 and other elements of repair tool 30 as desired. A conduit 62 may be connected to repair tool 30 and may for example be used to provide a working fluid to actuator 39 in order to operate jack 36.

Figure 3:
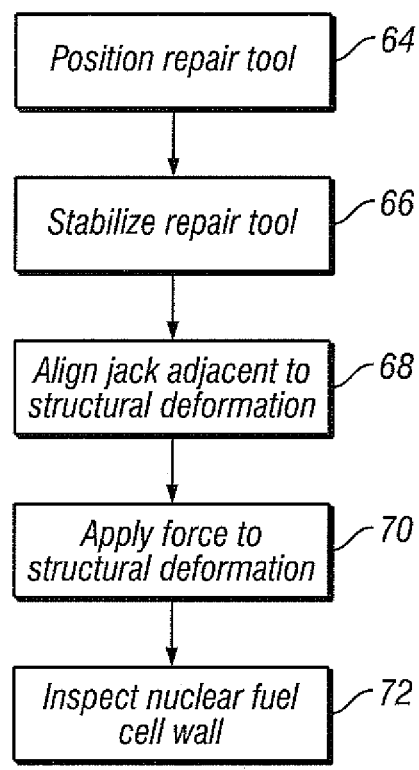
FIG. 3 is a flowchart illustrating a method of repairing a structurally deformed region of a fuel cell using a fuel cell repair tool as described herein.
Figure 4:
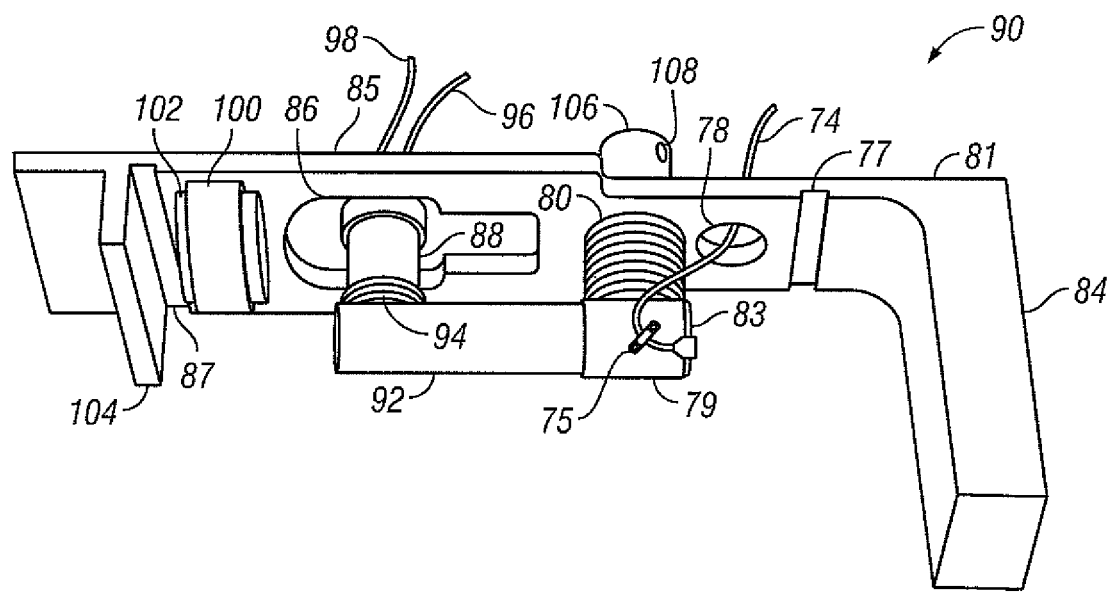
FIG. 4 is a bottom perspective view of another embodiment of a fuel cell repair tool.

A method of repairing a structural deformation of a nuclear fuel cell wall is shown in FIG. 3. In a first step 64, a repair tool may be positioned on a nuclear fuel cell. In some embodiments, positioning a repair tool may be accomplished by an operator manually placing a repair tool on a nuclear fuel cell. It may be useful to position a repair tool using a method where an operator remains at a remote location, away from a nuclear fuel cell. Remote positioning may have several advantages, including but not limited to allowing for repair without decontamination of a nuclear fuel cell or avoiding having to take protective steps for a repair tool operator. Remote positioning of a repair tool may therefore significantly reduce reactor downtime and therefore have significant economic benefit. In some embodiments, remote positioning of a repair tool may be accomplished by lowering the repair tool on a nuclear fuel cell using mechanical means. Those mechanical means may include but are not limited to the use of remotely controlled actuators. As illustrated in FIG. 1, a repair tool 30 may include an extension 33 with an opening 37 generally associated with that extension 33. A hook or other suitable means may be used to latch onto extension 33 through opening 37 and connect the repair tool 30 to suitable machinery for positioning repair tool 30 on a nuclear fuel cell. In some embodiments, other means of connecting repair tools to machinery for positioning those repair tools may involve the use of one or more extension elements, including but not limited to openings, holes, fasteners, clips, or straps. In some embodiments, one or more grooves may be included in repair tools such that those one or more grooves may be aligned to receive an edge of a nuclear fuel cell wall and thereby assist in the positioning of such repair tools. For example, and without limitation, as shown in FIG. 4, a first groove 77 and a second groove 87 may be used to assist in positioning of repair tool 90 such that walls 52 and 56 are disposed in grooves 77 and 87, respectively.

In a next step 66, a repair tool may be stabilized in place on a nuclear fuel cell. In some embodiments, stabilization of a repair tool in place may be accomplished with the repair tool resting in place on walls of a nuclear fuel cell. In some embodiments, the weight of the repair tool may be sufficient to stabilize the tool during at least part of its operation. In other embodiments, stabilization of a repair tool may involve some attachment means that attaches the repair tool to one or more walls of a nuclear fuel cell. Such attachment means may include but is not limited to clamps, latches, magnets, or other suitable means for holding a repair tool in contact with a wall or other component of a nuclear fuel cell reactor.

In a next step 68, a repair tool may be aligned in place such that a contact surface of a jack of the repair tool is adjacent to a structural deformity on the nuclear fuel cell wall. In some embodiments, one or more actuators may be used in alignment of a repair tool. As shown in FIG. 1 and FIG. 2, an actuator 39 may be used to position a contact surface 35 of a jack 36 of the repair tool 30 adjacent to a structural deformity 47 on the fuel cell wall 52. In repair tool 30, actuator 39 is capable of translating the contact surface 35 of jack 36 linearly along an axis such that the contact surface 35 of jack 36 moves towards inner surface 34 of post 40. In some embodiments, one or more actuators may be used and those one or more actuators may allow a jack to be translated in any direction in relation to a structural deformity, and that translation may involve motion towards or away from any of the walls of a nuclear fuel cell. In some embodiments, a jack may be capable of rotation about one or more axes of rotation. Such translation, rotation, or a combination of translation and rotation may in some embodiments allow the contact surface of a jack to be moved adjacent to any part of a structural deformity and to be oriented at any desired angle with respect to such structural deformity.

Various means may be used to guide a repair tool such that a contact surface of a jack of the repair tool is adjacent to a structural deformity on a nuclear fuel cell wall. In some embodiments, an operator may manually adjust one or more actuators of a repair tool while viewing the repair tool and structural deformity on a nuclear fuel cell wall. In other embodiments, including without limitation those embodiments where alignment is performed from a remote location, such alignment may be guided by an operator viewing a repair tool and structural deformity on a nuclear fuel cell wall by means including but not limited to a video image. In some embodiments, a video image may be collected using optical elements that may or may not be located on the repair tool itself. For example, a video camera located near the nuclear fuel cell or attached to the nuclear fuel cell may be used to image a structural deformity, feed that image signal to an operator at another location, and thereby enable the operator to guide the movement of a repair tool. In other embodiments, a video image may be collected using optical elements that are attached to or are part of a repair tool. Optical elements that may be attached to a repair tool and that may assist in guiding that repair tool so that a contact surface of a jack of that repair tool is adjacent to a structural deformity include but are not limited to a fiber optic cable, a laser, a photodetector, or any combination thereof. For example, and without intent to be limited, a fiber optic cable 74 is shown on a repair tool 90 in FIG. 4. Fiber optic cable 74 may be used to assist in alignment of repair tool 90. One advantage of using fiber optic technology in an imaging approach is that a fiber optic cable may be readily miniaturized. A fiber optic cable may, for example, be mounted on a location close to a jack element of a repair tool without interfering with other physical components of the repair tool. In some embodiments, additional sensor elements may be mounted on the repair tool, including but not limited to optical sensors or acoustic sensors for measuring the reflection of light or sound from a fuel cell wall to determine whether a structural deformation has been sufficiently repaired or for performing other diagnostics on a fuel cell wall.

In a next step 70, a repair tool applies a force to a structural deformation on a fuel cell wall. In some embodiments, application of that force may be accomplished by translation of a jack such that a contacting surface of that jack presses against a deformation on a fuel cell wall. For example, the repair tool shown in FIG. 1 and FIG. 2 includes a jack 36 with a contact surface 35. As displayed in FIG. 2, contact surface 35 of jack 36 may be aligned adjacent to a structural deformation 47. In some embodiments, a jack may apply a force by any number of means including, for example, and without intent to be limited, hydraulic, pneumatic, electromagnetic or mechanical means. Mechanical application of a force may be accomplished using any number of physical components, including without limitation a ratchet jack or screw jack. Hydraulic application of a force may be accomplished using any number of physical components, including without limitation a cylinder filled with a fluid and a plunger. Pneumatic application of a force may be accomplished using any number of physical components, including without limitation a cylinder filled with air and a plunger. Electromagnetic application of a force may be accomplished using any number of physical components, including without limitation a solenoid.

In some embodiments, application of a force may be accomplished by extension of a jack element such that a contact surface of a jack presses against a deformation on a fuel cell wall. The deformation may be pressed between the contact surface and another surface of the jack. For example, and without intent to be limited, a jack contact surface 35 and inner surface 34 are shown on a repair tool 30 in FIG. 1 and FIG. 2. As can be understood in reference to FIG. 2, as the jack contact surface 35 pushes against a structural deformation 47, the deformation 47 is effectively sandwiched between jack contact surface 35 and inner surface 34. The force applied with jack 36 is reacted against surface 34 of tool 30. In some embodiments, a repair tool may use clamping means during a stabilization step 66. In some embodiments, a repair tool may be clamped to a fuel cell wall on the opposite side of a nuclear fuel cell wall that contains a structural deformity. In some embodiments, a repair tool may apply a force by extending a jack contact surface against a structural deformation of a nuclear fuel cell wall. In some embodiments, such force may push against a structural deformation without pressing that structural deformation between a jack contact surface and an inner surface of a repair tool, such that the force applied by jack 36 is reacted against some other surface.

In a next step 72, an inspection may be performed on the nuclear fuel cell wall. In some embodiments, that inspection step 72 may be accomplished by means including but not limited to direct visual inspection, optical means, or a combination of both. In some embodiments, additional diagnostic tests may be performed.

Another repair tool 90 useful for repairing a structurally deformed nuclear fuel cell wall is shown in FIG. 4. Repair tool 90 includes a fiber optic cable 74 that is inserted through a hole 78 and is attached to the repair tool 90 using a fastener element 75. As shown in FIG. 4, a single fastener element 75 and a single fiber optic cable 74 are shown. In other embodiments, two or more fiber optic cables may be used, and those two or more fiber optic cables may be connected to one or more locations on a repair tool using one or more fasteners. Such fiber optic cables may be used to image a nuclear fuel cell wall or other parts of a nuclear fuel cell, as may be useful to align or inspect a repair tool or a deformity. The repair tool 90 shown in FIG. 4 includes a body 81, a first joint 80, and a second joint 94. First joint 80 connects a jack mount 79 to a jack 92. Second joint 94 connects actuator 88 to jack 92. Joints 80 and 94 may allow for the rotation or pivot of jack 92, and may allow contact surface 83 of jack 92 to be oriented at various angles. In some embodiments, one or more joints may permit a jack of a repair tool to be rotated or translated in any direction. Repair tool 90 also includes a first post 84 and a single arm element 85. A hole 86 is included in the repair tool through which an actuator 88 is connected via second joint 94 to jack 92, which may be spaced apart from post 84 as shown in FIG. 4. Actuator 88 may function to translate a contact jack surface 83 of jack 92 linearly towards a structural defect of a nuclear fuel cell wall. Repair tool 90 may also include a connecting wire 96, which may be used to provide power to actuator 88 or to other elements of repair tool 90. A conduit 98 may also be connected to repair tool 90 and may for example be used to provide a fluid to actuator 88 of repair tool 90. Repair tool 90 may include a first groove 77 and a second groove 87, which may function to assist in positioning step 64 as described above. Repair tool 90 may include a clamping actuator 100 that may apply a clamping actuator surface 102 against a fuel cell wall and press that fuel cell wall against a second post 104 of repair tool 90. An extension 106 having an opening 108 therein may be provided to assist in lowering tool 90 in place and retrieving tool 90.

Although the foregoing embodiments illustrate tools having one jack, other embodiments may have two or more jacks which may be arranged so as to apply forces and moments in any desired direction. Additionally, although the foregoing embodiments illustrate application of "pushing" forces, other embodiments may apply "pulling" forces and/or twisting moments in any desired manner to repair structural deformations of nuclear fuel cell walls.

Although the foregoing specific details describe certain embodiments of this invention, persons reasonably skilled in the art will recognize that various changes may be made in the details of this invention without departing from the spirit and scope of the invention as defined in the appended claims and considering the doctrine of equivalents. Therefore, it should be understood that this invention is not to be limited to the specific details shown and described herein.

What is claimed is:

1. A nuclear fuel cell repair tool, comprising:
 a main body;
 a jack depending from said main body, said jack being adapted for applying a force to a structural deformation of a nuclear fuel cell;
 a support member depending from said main body, said support member being adapted for supporting said tool on the nuclear fuel cell; and
 a force reacting member depending from said main body, said force reacting member being adapted for engagement with the nuclear fuel cell and being aligned with and spaced apart from said jack.

2. The nuclear fuel cell repair tool of claim 1 further comprising an optical element positionable so as to provide an image of the structural deformation.

3. The nuclear fuel cell repair tool of claim 2 wherein said optical element is selected from a fiber optic cable, a laser, and a photodetector.

4. The nuclear fuel cell repair tool of claim 1 further comprising an extension extending from said main body, wherein said extension is adaptable for attachment to a lifting device.

5. The nuclear fuel cell repair tool of claim 1 wherein said support member comprises a groove adapted for receiving a portion of the nuclear fuel cell.

6. The nuclear fuel cell repair tool of claim 1 further comprising an attachment means for attaching said tool to the nuclear fuel cell.

7. The nuclear fuel cell repair tool of claim 1 wherein said jack is mounted to said main body with a joint.

8. The nuclear fuel cell repair tool of claim 7 wherein said joint permits translation and rotation of said jack.

9. The nuclear fuel cell repair tool of claim 1 further comprising an actuator adaptable for activating said jack.

10. The nuclear fuel cell repair tool of claim 1 wherein said jack comprises a contact surface adapted for linear translation toward said force reacting member.

11. A method of repairing a structural deformation of a nuclear fuel cell wall, comprising:
   positioning a repair tool having a jack and a force reacting member on a nuclear fuel cell;
   aligning said jack and said force reacting member with the structural deformation such that the structural deformation is disposed between said jack and said force reacting member; and
   applying a force to the structural deformation using said jack.

12. The method of claim 11 wherein:
   said positioning is accomplished by an operator located at a remote location from the nuclear fuel cell.

13. The method of claim 11 wherein:
   said aligning is accomplished using one or more actuators.

14. The method of claim 11 further comprising:
   inspecting the structural deformation.

15. The method of claim 14 wherein said inspecting comprises direct visual inspection.

16. The method of claim 14 wherein said inspecting comprises inspection via an optical element.

17. A nuclear fuel cell repair tool comprising:
   a main body and an arm element depending from said main body, each of said main body and said arm element comprising a groove adapted for supporting said tool on a nuclear fuel cell;
   a jack mounted to said main body with at least one joint, said jack comprising a contact surface adapted for engagement with a structural deformation of the nuclear fuel cell, said at least one joint adapted to orient said contact surface at various angles;
   a first post depending from said main body and being spaced apart from said jack;
   a first actuator operably connected to said jack and adapted for causing said contact surface of said jack to apply a force to said structural deformation; and
   a fiber optic cable positioned on said tool so as to provide an image of said structural deformation.

18. The nuclear fuel cell repair tool of claim 17 further comprising a second post and a clamping actuator depending from said arm element, said clamping actuator comprising a clamping actuator surface adapted for pressing a wall of the nuclear fuel cell against said second post.

19. The nuclear fuel cell repair tool of claim 17 wherein said first actuator is connected to said jack with a joint.

20. The nuclear fuel cell repair tool of claim 17 wherein said at least one joint permits said jack to be rotated or translated in any direction.

* * * * *